Figure 1:
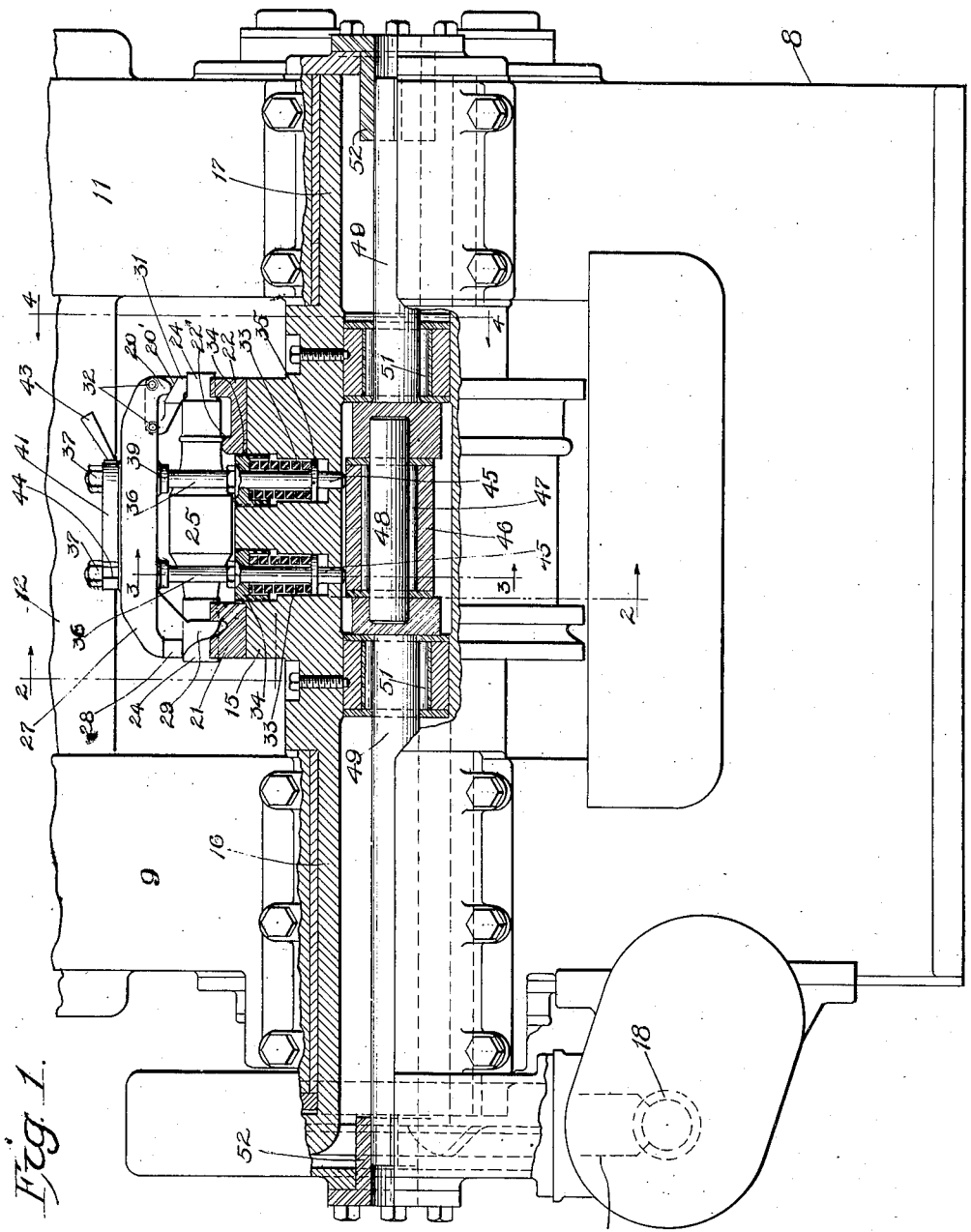

April 14, 1925.

W. C. SPROUL 1,533,710

AUTOMATIC WORK FIXTURE

Filed Jan. 19, 1921    3 Sheets-Sheet 1

Inventor:
William C. Sproul
By Ira J. Wilson
Atty

Inventor:
William C. Sproul
By Ira J. Wilson
Atty

April 14, 1925.  
W. C. SPROUL  
AUTOMATIC WORK FIXTURE  
Filed Jan. 19, 1921  
1,533,710  
3 Sheets-Sheet 3

Inventor;  
William C. Sproul  
By Ira J. Wilson  
Atty

Patented Apr. 14, 1925.

1,533,710

UNITED STATES PATENT OFFICE.

WILLIAM C. SPROUL, OF ROCKFORD, ILLINOIS, ASSIGNOR TO THE INGERSOLL MILLING MACHINE COMPANY, OF ROCKFORD, ILLINOIS, A CORPORATION OF ILLINOIS.

AUTOMATIC WORK FIXTURE.

Application filed January 19, 1921. Serial No. 438,402.

*To all whom it may concern:*

Be it known that I, WILLIAM C. SPROUL, a citizen of the United States, residing at Rockford, in the county of Winnebago and State of Illinois, have invented certain new and useful Improvements in Automatic Work Fixtures, of which the following is a specification.

This invention pertains in general to work holders, and comprehends broadly the provision of an automatic work holder or fixture generally applicable to machines in which the work-pieces are fed in succession past the cutting tool.

The primary object of the invention is to provide a fixture of the character described which shall automatically clamp and rigidly hold the work-pieces by spring pressure during a cutting period and shall release the work-pieces during a loading and unloading period. In utilizing powerful spring pressure for holding the work-pieces, my invention supersedes the manually operated fixtures now in common use, and enables a greater saving in time, labor, and cost in the production of forgings or castings requiring machine operations. This is especially true in milling, planing, grinding and similar machines where forgings or castings are handled in large numbers.

In furtherance of the foregoing, my invention contemplates broadly stated, the provision with a traveling fixture adapted to be moved through a loading and a cutting period of operation and constructed for holding a plurality of work-pieces which are fed in succession past the cutting tool or tools, of work-clamping devices operated by powerful coil compression springs for automatically clamping the work-pieces during the cutting period and releasing them during the loading period.

This principle of operation may be applied in various ways; and in the present case I have taken as an example its application to a milling machine of the rotary drum fixture type, in which the work-pieces, adapted to be clamped in circumferentially spaced relation to the fixture, are carried in succession past the milling cutters. In such application, the work-pieces are automatically clamped and rigidly secured to the fixture during the cutting period and are released during the loading and unloading period.

I have also aimed to provide a work-holding fixture of improved and novel design, the principles of which are of general application, especially for holding work-pieces in the form of forgings and castings, such as are required in large quantities in the automobile and tractor industries.

Other objects and attendant advantages will be appreciated by those skilled in this art as the invention becomes better understood by reference to the following description when considered in connection with the accompanying drawings, in which—

Figure 2:
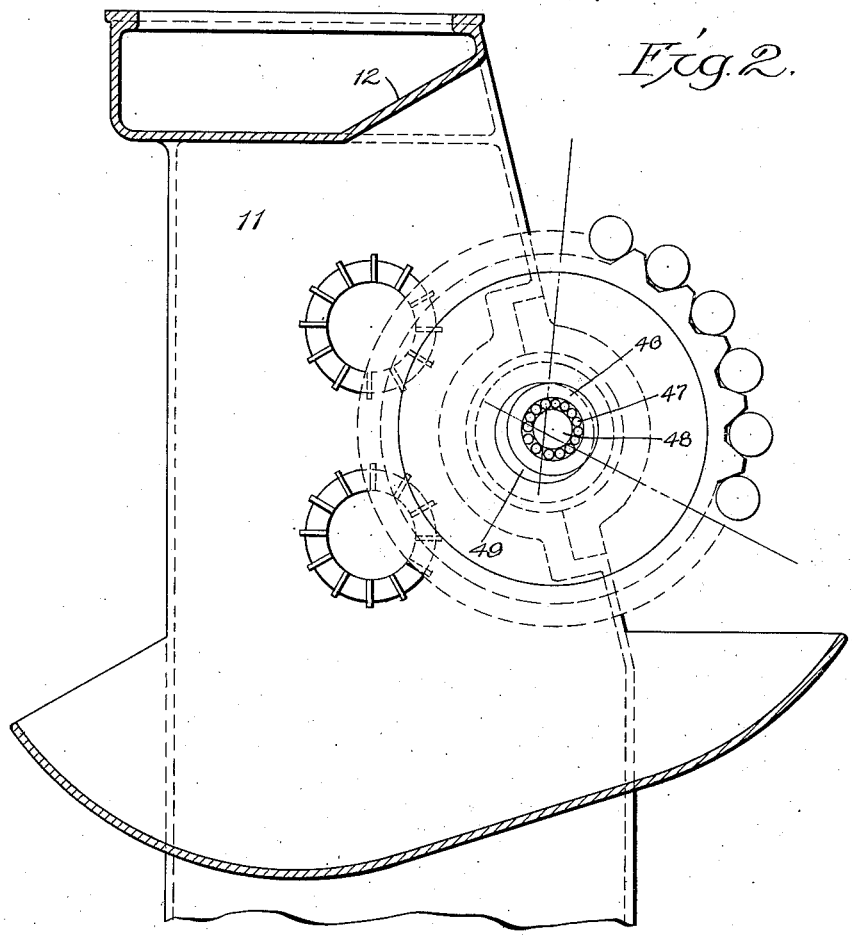
Figure 3:
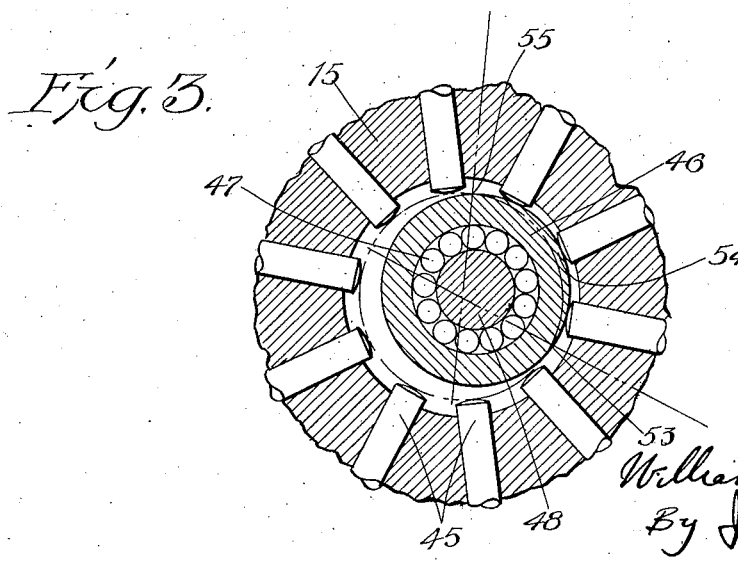
Figure 4:
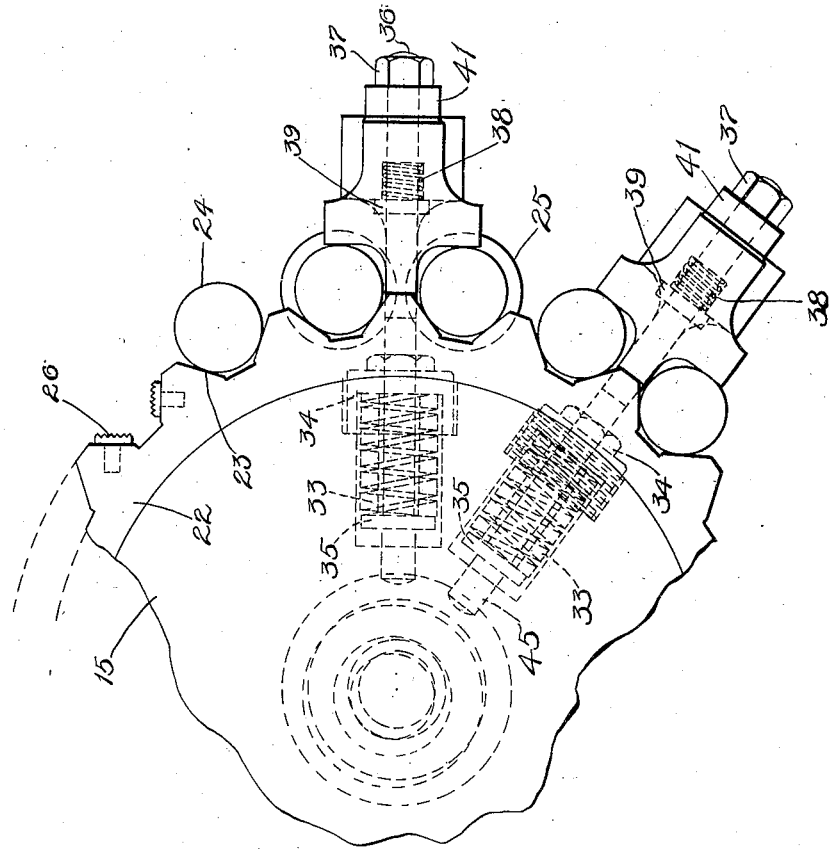
Figure 5:
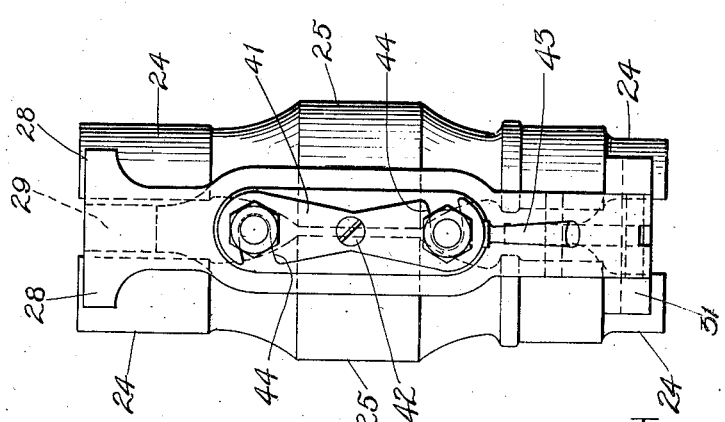

Figure 1 is a front elevation, partly in section, of a milling machine embodying my invention;

Fig. 2, a sectional view through the machine taken substantially on the line 2—2 of Fig. 1;

Figs. 3 and 4, enlarged fragmentary sectional views taken substantially on the lines 3—3 and 4—4 of Fig. 1; and Fig. 5, a top view of one of the work-holding clamps in operative position.

In illustrating the principles of my invention, I have taken as a working example their application to a milling machine of the continuous-feed rotary drum type. In this machine the work-pieces are held in circumferentially spaced relation on the drum fixture, and by rotating the latter they are carried in succession between milling cutters. My invention provides for automatically clamping the work-pieces and holding them rigidly on the fixture by a powerful spring pressure during the cutting period and for automatically releasing the work-pieces, so that they may be quickly and easily removed and replaced during the loading period. In the particular example given, the work-pieces are forgings for worm shafts, the initial operation being to surface mill both ends of the forging. The fixture has, therefore, been particularly designed to accommodate and hold these forgings. It will be manifest that when forgings and castings of different shapes are to be machined, the fixture will be constructed to suit the conditions and requirements of the particular work-piece. Each application shall include, however, the principles of my invention characterized, as will be more fully described hereinafter, by the use of a traveling fixture, and the work-holding devices which are operated by powerful spring pressure controlled automatically for clamping and releasing the work-pieces at the different periods of operation.

Referring now to the present example, it will be observed that a suitable frame is provided comprising a base 8, having upright side housings 9 and 11, rigidly joined by an overhead housing 12. Upon each side housing is mounted a pair of cutter spindles (not shown) adapted to carry cutters indicated by 13 and 14 for roughing and finishing respectively. These cutter spindles may be similar in construction and mounting to those shown in the application of John R. Johnson, Ser. No. 508,341, which relates to a drum type milling machine of the character disclosed herein. Any suitable mechanism may be provided for continuously revolving the cutters.

The work-carrier is at present in the form of a rotary drum designated generally by character 15, interposed between the side housings 9 and 11 and having cylindrical ends 16 and 17 journaled in suitable bearings on the side housings. Any suitable mechanism may be provided for revolving the drum, as by means including a worm 18 and a worm gear 19, the latter fixed to the end 16 of the drum. There is rigidly fixed to the drum proper a pair of locating rings, designated generally by 21 and 22 shaped to provide aligned V-shaped sockets or work seats 23, on its periphery for the reception of the cylindrical ends 24 of the work-pieces 25. The sockets may be faced with serrated pads 26, (Fig. 4) if required. Devices are now provided, preferably in the form of clamps, for rigidly holding the work-pieces in the sockets 23 on the drum. These clamps, designated generally by 27, are each shaped to hold two work-pieces. Each clamp has feet 28 at one end adapted to rest on the adjacent ends of two work-pieces and has an inwardly extending dividing lug 29 disposed between the work-pieces. Each clamp at its opposite end is equipped with a shoe 31, loosely pivoted at 32 and resting on both adjoining work-pieces. The pivot pins 32 are fixed in the clamp and the holes in the shoe are slightly larger than the pins, permitting the shoe to move slightly in any direction. This construction permits the clamp to seat tightly on each end of both work-pieces, regardless of variations in dimensions of the work-pieces. When the clamp is drawn down upon the work-piece, as will be presently described, it will also locate and hold the work-piece against shifting lengthwise. This is effected by the lugs 20 on the clamp, which are drawn down against the inclined faces 20' on the shoe 31 and force the work-piece to the left, Fig. 1, against the abutment 22' on the locating ring 22, this lengthwise thrust on the work-piece being opposed by the lug 29 which engages the opposite locating ring 21.

Powerful coil compression springs are now provided for imparting the clamping action. In the present example, a pair of such coil compression springs 33, is employed for each clamp. Each spring is confined between an adjustable cap 34 threadingly engaged in the drum and a collar 35 fixed to a clamp bolt 36. The clamp bolts, freely movable through the spring caps 34 and the clamp 27, are equipped at their outer ends with adjustable stops 37 in the form of nuts. Each clamp 27 has a limited movement axially upon its bolts 36 and is constantly urged outwardly by coil compression springs 38 confined between the clamp and collars 39 and fixed to the bolts 36. A washer 41 pivoted at 42 to each clamp intermediate its bolts 36 is adapted to be oscillated by its hand lever 43 into and out of engagement with the clamp bolts, it being noted viewing Fig. 5, that the washer is provided on its opposite sides with bolt sockets 44 for this purpose. Each clamp bolt 36 has an inner cam follower end 45 adapted to bear against the periphery of an eccentric cam 46. The cam is eccentrically disposed with respect to the axis of rotation of the drum as plainly shown in Fig. 3. In the present type of machine, I support this cam on anti-friction roller bearings 47 so that it is free to revolve about the eccentric support 48 which in turn is rigidly carried by supports 49 concentric with the drum and each supported at its inner end in bearings 51 in the drum and at its outer end is keyed in a sleeve 52 fixed to the main frame. Each spring 33 in the present instance, has a pressure of approximately 5000 pounds, which is applied to its clamp 27 for rigidly securing the work-pieces on the fixture. This clamping pressure is applied and released under control of the cam 46 as the fixture revolves. It will be manifest viewing Fig. 3, that as the fixture revolves in a counter-clockwise direction, the followers 45 will be carried into contact with the eccentric 46 at approximately the point 53 and will be gradually forced outwardly, compressing the springs 33 and releasing the clamp, which in the position 54 is full open. As the followers continue, the spring pressure is gradually applied to the clamp until it approaches the point 55, at which the followers leave the eccentric and the clamp is under the full influence of the spring pressure. It will thus be seen that each cycle is divided into what might be termed a loading and unloading period of operation comprising in this instance approximately 112 degrees and a cutting period of 248 degrees, during the latter of which the work-pieces are rigidly clamped to the fixture, these proportions being relative only to the particular example at hand. During this operation, it will be noted that by reason of the powerful pressure of the followers 45 against the eccentric ring 46 at the loading and unloading station, the frictional contact being so great, the ring will revolve with the fixture, thus avoiding any appreciable sliding contact between the cam and cam followers. It will also be observed that the pressure on the eccentric ring is reduced to a minimum by reason of the fact that the loading and unloading period is made relatively short.

In operaion, the fixture is continuously revolved in a counter-clockwise direction viewing Fig. 2, in a slow feed movement. The operator stands at the loading station, that is, at the right hand of the machine, and when a clamp reaches the proper height, he pushes the handle 43 downwardly, allowing the springs 38 to force the clamp 27 outwardly against the stops 37, giving free access to the fixture sockets. Work-pieces may then be inserted in the adjoining sockets 23 located beneath the clamp. The operator then pushes the clamp inwardly compressing the springs 38 and by pushing upwardly on the handle 43, swings the washer 41 beneath the stops 37, thus taking up the play between the fixed and movable elements of the fixture necessary for free loading and unloading. As these work-pieces continue toward the cutters, they will be rigidly clamped to the fixture by the powerful spring action above referred to. It will be observed that the work-pieces are held in their final position entirely by pressure of the springs 33, the gradually applied spring pressure permitting the clamp to accommodate itself to any variations in dimensions of the work-pieces. This action is distinctly different from the clamping action employed in other work fixtures now in common use, in which the work-pieces are clamped either by a cam action or by pressure applied by nut and bolt, the latter obviously requiring considerable time and manual labor for tightening and loosening the nuts, and the former being objectionable because of the wear imposed by the heavy strains, and because it does not take care of variations in the work-pieces.

From the foregoing it will be apparent that the present invention comprehends the embodiment in any suitable work fixture, referred to hereinafter in some of the claims as a work drum, which travels with respect to the cutting tool, of work-clamping devices operated solely by powerful spring pressure for rigidly holding the work-piece during the cutting operation; and that it further comprehends the provision of a suitable cam or the equivalent for causing the spring pressure to be applied and released as the fixture moves relatively to the cutting tool through loading and cutting periods. It follows, therefore, that the shape and construction of the frame, the mounting and construction of the fixture, the number and arrangement of the cutters and the particular construction of the work holding devices and means for applying and releasing the spring pressure shown herein as one working embodiment, may be changed and modified to suit the conditions and requirements of any particular job; and that the invention is applicable to many types of work holders or fixtures.

It is believed that the foregoing conveys a clear understanding of the objects prefaced above, and while I have illustrated one practical embodiment of the invention, it should be understood that it is generally applicable without departing from the spirit and scope of the appended claims, in which I claim:

1. In a machine of the character described, in combination, a frame having laterally spaced side housings, a work-carrying drum interposed between said housings and having cylindrical ends journaled thereon, means for rotating the drum, a pair of locating rings axially spaced on the drum having circumferentially spaced work seats, clamps for holding the work down on said seats, radially disposed clamp bolts held in the drum and connected to the work clamps, a coil compression spring on each bolt operative against the work drum for moving its bolt inwardly to clamp the work, an eccentric cam within the work drum, and each clamp bolt having a follower at its inner end adapted to ride on said cam and to be operated thereby for releasing its clamp from the work.

2. An automatic work fixture comprising, in combination, a rotary work drum having on its periphery circumferentially spaced work seats, clamps disposed beyond the work drum for holding the work-pieces down on the work seats, radially disposed clamp bolts held against axial displacement with respect to the drum but adapted to be moved axially with respect thereto in a clamping and releasing action, a compression spring operative between each clamp bolt and drum for imposing the clamping pressure, a connection between each clamp bolt and its clamp for transmitting said clamping and releasing action and permitting the clamp to be moved relatively to the bolt for removal of the work from said drum, and means within the drum for operating the clamp bolts to release the clamping pressure.

3. An automatic work fixture comprising, in combination, a rotary work drum having axially spaced locating seats on which work-pieces are adapted to be seated with each work-piece disposed on an axis parallel with the axis of rotation of the drum, clamps disposed at the outer side of the drum and adapted for engaging the work-pieces at opposite ends thereof for holding them down against the fixtures, and spring-operated clamp bolts carried by the drum intermediate said axially spaced work seats and connected with the clamps for imposing radial clamping pressure.

4. An automatic work fixture comprising, in combination, a rotary work drum having axially spaced locating seats on which work-pieces are adapted to be seated within each work-piece disposed on an axis parallel with the axis of rotation of the drum, clamps disposed at the outer side of the drum and adapted for engaging the work-pieces at opposite ends thereof for holding them down against the fixtures, spring-operated clamp bolts carried by the drum intermediate said axially spaced work seats and connected with the clamps for imposing radial clamping pressure, and means whereby each clamp will impart a lengthwise thrust to its work-piece in addition to the radial pressure for locating the work-piece on its seats.

5. In a machine of the character described, the combination of a frame having upright side housings, a drum type work-carrier interposed between said side housings and having cylindrical ends journaled thereon, means for revolving said work-carrier, means for securing work-pieces in circumferentially spaced relation on the work-carrier including clamps, radially disposed clamping members for operating said clamps, compression springs adapted to act through said members for applying the clamping pressure, and means within said carrier for actuating said members to release said pressure.

6. In a machine of the character described, the combination of a frame having upright side housings, a cutting tool on said frame, a rotary work drum interposed between and journaled on the side housings, means for holding work-pieces in circumferentially spaced relation on the drum whereby they will be carried past and be machined by the cutter when the drum is revolved, said means including movable clamps, spring-operated means on the drum for moving the clamps in the clamping action by spring pressure, and means for releasing said spring pressure from the clamps during a loading and unloading period in the rotation of the drum.

7. An automatic work fixture comprising in combination, a rotary work drum equipped at opposite ends with circumferentially spaced work seats, clamps at the outer side of the work drum for holding work-pieces down on said seats, radially disposed clamp bolts located between the work seats at the ends of the drum and connected with the clamps for clamping and releasing them, compression springs operative between the drum and clamp bolts for imparting clamping pressure thereto, and cam means within the drum for imparting the clamp releasing pressure to the bolts.

8. In an automatic work fixture, in combination, a rotary work drum having circumferentially spaced work seats on its periphery, clamps beyond the drum for holding work-pieces down on said seats, radially disposed clamp bolts for imparting clamping and relasing movement to the clamps, compression springs operative between the drum and clamp bolts for imparting the clamping pressure thereto, a fixed supporting member eccentrically disposed within the drum, a thrust ring on said member, an antifriction bearing between said ring and its supporting member, and each clamp bolt having a follower at its inner end adapted to ride on the thrust ring and be moved thereby for releasing its clamp.

9. In a machine of the character described, the combination of a frame having upright side housings, a cutting tool on one of said side housings, a fixture revoluble on the frame between the housings to carry circumferentially spaced work-pieces in succession past the cutting tool, spring-operated clamps for holding the work-pieces to the fixture, a cam within the fixture, and means controlled by the cam for causing the spring pressure to be applied and released to clamp and release the work-pieces during cutting and loading periods, respectively.

10. In a machine of the character described, the combination of a frame having upright side housings, a cutting tool on said frame, a fixture revoluble on the frame between the housings to carry circumferentially spaced work pieces in succession past the cutting tool, spring-operated clamps for holding the work-pieces to the fixture, an eccentric cam within the fixture, and means operated by the eccentric cam as the fixture revolves permitting the spring pressure to be applied and released to clamp and release the work-pieces during the cutting and loading periods, respectively.

11. In an automatic work fixture, in combination, a rotary work drum having circumferentially spaced work seats on its periphery, clamps for holding the work-pieces down on said work seats, radially disposed clamp-operating bolts, a cap on each bolt held against outward movement with respect thereto and threadingly connected to the drum, a collar fixed on each bolt inward of said cap, a compression spring on each bolt interposed between its collar and cap for urging the bolt inwardly, and means for moving the bolt outwardly against the spring pressure to release the clamp.

12. In an automatic work fixture, in combination, a rotary work drum having axially spaced locating rings provided with circumferentially spaced V-shaped work seats, clamps at the outer side of the drum for holding work-pieces down on said seats, radially disposed spring-operated clamp bolts carried by the drum intermediate said rings for imparting the clamping pressure, and means for moving the clamp bolts outwardly against such spring pressure for releasing the clamps.

13. In an automatic work fixture, in combination, a rotary work drum having axially spaced locating rings provided with circumferentially spaced V-shaped work seats, clamps at the outer side of the drum for holding work-pieces down on said seats, radially disposed spring-operated clamp bolts carried by the drum intermediate said rings for imparting the clamping pressure, means for moving the clamp bolts outwardly against such spring pressure for releasing the clamps, and means on the clamp bolts for moving the clamps outwardly upon and with respect to the bolts when the latter have been moved in said releasing action.

14. An automatic fixture of the character described comprising a work-carrier constructed to support the work-pieces in spaced relation, work clamps, a clamp bolt for each clamp, a coil compression spring confined between the work-carrier and each bolt so that its pressure is applied for clamping the work-piece to the work-carrier, a cam-means for operating the clamp bolts as the work-carrier is moved through cutting and loading periods for clamping and releasing the work-pieces, each clamp bolt extending beyond its clamp and equipped at its outer end with a stop, and a washer pivoted on each clamp and movable into and out of the space between the stop and the clamp.

15. An automatic fixture of the character described comprising a work-carrier constructed to support the work-pieces in spaced relation, work clamps, a clamp bolt for each clamp, a coil compression spring confined between the work-carrier and each bolt so that its pressure is applied for clamping the work-piece to the work-carrier, a cam means for operating the clamp bolts as the work-carrier is moved through cutting and loading periods for clamping and releasing the work-pieces, each clamp bolt extending through its clamp and equipped at its outer end with a stop, a coil compression spring on each clamp bolt urging its clamp outwardly against said stop, and means insertable in the space between each clamp and its stop when the clamp is moved on its bolt to an inner position.

16. In an automatic work fixture, in combination, a work-carrier having work seats on its top face adapted for locating and supporting a series of elongated work-pieces, the seats for each work-piece being spaced longitudinally thereof, a work clamp positioned above each work-piece for holding it down on its respective seats, clamp bolts on the work carrier disposed between said longitudinally spaced work seats for imparting clamping and releasing pressure to the clamps, springs operative between the work-carrier and the clamp bolts for imposing the clamping pressure, and means for relieving said clamping pressure.

17. In an automatic work fixture, in combination, a work-carrier having work seats on its top face adapted for locating and supporting a series of elongated work-pieces, the seats for each work-piece being spaced longitudinally thereof, a work clamp positioned above each work-piece for holding it down on its respective seat, clamp bolts on the work-carrier disposed between said longitudinally spaced work seats for imparting clamping and releasing pressure to the clamps, springs operative between the work-carrier and clamp bolts for imposing the clamping pressure, means for relieving said clamping pressure, and means operative between the clamp bolts and clamps for raising the latter upon and with respect to the bolts when they have been released.

18. In an automatic work fixture, in combination, a work-carrier having work seats on its top face adapted for locating and supporting a series of elongated work-pieces, the seats for each work-piece being spaced longitudinally thereof, a work clamp positioned above each work-piece for holding it down on its respective seat, clamp bolts on the work-carrier disposed between said longitudinally spaced work seats for imparting clamping and releasing pressure to the clamps, springs operative between the work-carrier and clamp bolts for imposing the clamping pressure, means for relieving said clamping pressure, and means whereby the clamps will impart a longitudinal thrust to the work-pieces when clamping them down onto the work-carrier.

19. In a work fixture of the character described, in combination, a work-carrier having spaced locating seats upon which a work-piece is adapted to be positioned and supported at opposite ends, a clamp positioned above the work-piece extending lengthwise thereof for clamping it against said locating seats, a stop on the work-carrier against which the clamp has an end thrust connection, means for forcing the clamp down toward the work-carrier in a clamping action, and means operative between the clamp and work-piece for urging the latter lengthwise against said stop when said clamping pressure is applied.

20. An automatic work fixture comprising in combination, a rotary work drum provided on its periphery with circumferentially spaced work-locating seats, clamps at the outer side of the drum for holding work-pieces down on said seats, radially disposed clamp bolts for clamping and releasing the clamps, springs for urging the clamp bolts inwardly for imparting the clamping pressure, means within the drum for releasing said spring pressure and thereby releasing the clamps, each clamp having a limited amount of radial play on its clamp bolts to permit withdrawal of the clamp after said spring pressure has been released, and means for preventing such play when the clamp is in position for the clamping action.

21. The combination of a frame having upright side housings, a rotary work drum interposed between the side housings and having cylindrical ends journaled thereon, means for revolving the drum, a work fixture on the drum for carrying work-pieces in circumferentially spaced relation including locating seats fixed with respect to the drum and movable clamps at the outer side of the seats for clamping the work down on said seats, radially disposed clamp-operating bolts, spring means for imposing clamping pressure on said bolts, a supporting shaft concentrically disposed within each cylindrical end of the work drum and having a bearing therein and being held against rotation, a supporting shaft disposed intermediate and carried by said fixed supporting shafts in eccentric relation thereto, a thrust ring revoluble on said eccentric supporting shaft, and means adapted to be brought into and out of contact with said ring upon rotation of the work drum for relieving said clamping pressure.

22. An automatic work fixture comprising, in combination, a rotary drum having circumferentially spaced work-locating seats on its periphery, clamps at the outer side of the drum for clamping work-pieces down on said seats, an eccentric support within the drum, a thrust ring on said support, and means for imparting clamping pressure to the clamps and adapted to be released by engagement with said thrust ring.

23. An automatic work fixture comprising, in combination, a rotary work drum having adjacent to each end, circumferentially spaced work seats on its periphery, clamps extending lengthwise of the drum for clamping work-pieces down on said seats, a pair of radially disposed clamp bolts for each clamp spaced apart lengthwise of the drum and mounted to turn therewith, each bolt being independently movable lengthwise of its axis and connected at its outer end with its clamp, a spring operative between each bolt and the drum for forcing its bolt inwardly to apply clamping pressure to its clamp, whereby an independent clamping action will be applied to each end portion of each clamp, and means for releasing said clamping pressure.

24. An automatic work fixture as set forth in claim 23, including means whereby each clamp is capable of limited outward movement upon and with respect to its clamp bolts when the clamping pressure is released.

25. An automatic work fixture as set forth in claim 23, including means whereby each clamp is capable of limited outward movement upon and with respect to its clamp bolts when the clamping pressure is released, said means comprising a part pivoted on each clamp and movable into and out of an operative position in the latter of which to prevent said outward movement of the clamp.

26. An automatic work fixture comprising, in combination, a rotary work drum, clamps circumferentially spaced about the drum and extending lengthwise thereof and adapted for clamping work-pieces down on the drum, a pair of radially disposed clamp bolts for each clamp spaced apart lengthwise of the drum axis and mounted to revolve therewith, each bolt being adapted to be moved in a clamping and a releasing action, spring means for imparting clamping pressure to the bolts, and means for releasing the clamping pressure.

WILLIAM C. SPROUL.